United States Patent
Lee et al.

(10) Patent No.: US 10,174,724 B2
(45) Date of Patent: Jan. 8, 2019

(54) FUEL REFORMING SYSTEM FOR VEHICLE

(71) Applicant: HYUNDAI MOTOR COMPANY, Seoul (KR)

(72) Inventors: Seung Woo Lee, Seoul (KR); Hong Kil Baek, Seoul (KR); Tae Won Lee, Incheon (KR); Ju Hun Lee, Gwangmyeong-si (KR); Jeong Hwa Cha, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/335,968

(22) Filed: Oct. 27, 2016

(65) Prior Publication Data

US 2018/0010555 A1 Jan. 11, 2018

(30) Foreign Application Priority Data

Jul. 6, 2016 (KR) ........................ 10-2016-0085654

(51) Int. Cl.
 *F02M 25/12* (2006.01)
 *F02M 25/07* (2006.01)
 (Continued)

(52) U.S. Cl.
 CPC ......... *F02M 25/12* (2013.01); *F02D 19/0671* (2013.01); *F02M 26/06* (2016.02); *F02M 26/07* (2016.02); *F02M 26/09* (2016.02); *F02M 26/15* (2016.02); *F02M 26/22* (2016.02); *F02M 26/36* (2016.02); *F02M 26/23* (2016.02)

(58) Field of Classification Search
 CPC ........ F02M 25/12; F02M 26/36; F02M 26/09; F02M 26/22; F02M 26/15; F02M 26/06
 See application file for complete search history.

(56) References Cited

U.S. PATENT DOCUMENTS 3,074,390 A  1/1963  O'Laughlin
3,918,412 A  11/1975  Lindstrom
(Continued)

FOREIGN PATENT DOCUMENTS

CN  104 471 229 A  3/2015
DE  10 2012 204649 A1  9/2013
(Continued)

OTHER PUBLICATIONS

Extended European Search Report dated Jan. 5, 2017, issued in European patent application European patent application No. 16197305.2.

(Continued)

*Primary Examiner* — Jacob Amick
(74) *Attorney, Agent, or Firm* — McDermott Will & Emery LLP

(57) ABSTRACT

A fuel reforming system for a vehicle includes an Exhaust Gas Recirculation (EGR) line for recirculating a part of exhaust gas of an engine towards an intake side, a fuel reformer provided on the EGR line, the fuel reformer reforming fuel that is to be supplied to the engine, and the fuel reformer supplying the reformed fuel to the engine via the EGR line, an EGR valve provided downstream of the fuel reformer, and a pressure control valve provided in the fuel reformer for controlling an inner pressure of the fuel reformer.

6 Claims, 7 Drawing Sheets

(51) Int. Cl.
*F02M 26/09* (2016.01)
*F02M 26/15* (2016.01)
*F02M 26/22* (2016.01)
*F02D 19/06* (2006.01)
*F02M 26/06* (2016.01)
*F02M 26/07* (2016.01)
*F02M 26/36* (2016.01)
*F02M 26/23* (2016.01)

(56) References Cited

U.S. PATENT DOCUMENTS

| | | | |
|---|---|---|---|
| 4,125,090 A | | 11/1978 | Masunaga et al. |
| 2003/0140662 A1 | | 7/2003 | Hsu |
| 2006/0042565 A1 | | 3/2006 | Hu |
| 2008/0295501 A1 | | 12/2008 | Gong et al. |
| 2010/0031939 A1 | | 2/2010 | Ono |
| 2010/0101226 A1 | * | 4/2010 | Shutty .............. F02D 41/0072 60/602 |
| 2012/0048216 A1 | | 3/2012 | Tomazic et al. |
| 2013/0333639 A1 | * | 12/2013 | Hoshino .............. B01J 23/96 123/3 |
| 2015/0075451 A1 | * | 3/2015 | Inuzuka ............. F02D 41/0065 123/3 |
| 2015/0267649 A1 | * | 9/2015 | Remes .................. F01N 3/20 60/605.2 |

FOREIGN PATENT DOCUMENTS

| | | |
|---|---|---|
| DE | 20 2014 102098 U1 | 7/2014 |
| JP | 58-018546 | 2/1983 |
| JP | 2014-148946 A | 8/2014 |
| JP | 2016-020645 A | 2/2016 |
| KR | 10-2003-0082762 A | 10/2003 |
| KR | 10-2008-0017570 A | 2/2008 |

OTHER PUBLICATIONS

Office Action issued in European Patent Application No. 16 197 305.2, dated Jul. 4, 2018.

* cited by examiner

FUEL REFORMING SYSTEM FOR VEHICLE

CROSS REFERENCE TO RELATED APPLICATION

The present application claims the benefit of priority to Korean Patent Application No. 10-2016-0085654, filed Jul. 6, 2016 with the Korean Intellectual Property Office, the entire content of which is incorporated herein for all purposes by this reference.

TECHNICAL FIELD

The present disclosure relates generally to a fuel reforming system for a vehicle and, more particularly, to a fuel reforming system provided in an engine compartment of a vehicle to reform fuel for an engine and supply the reformed fuel to the engine.

BACKGROUND

Generally, hydrogen ($H_2$) has a much higher flame propagation speed and a lower heating value than that of gasoline, so when combusting a mixture of gasoline and hydrogen ($H_2$), it is possible to solve problems of knocking or unstable combustion that tend to occur due to an increase in compression ratio of an engine in a combustion process to a considerable extent, thereby securing a technological base for improving fuel mileage of the engine.

Thus, a technology for supplying hydrogen ($H_2$) with gasoline to the engine is advantageous. However, such technology requires an additional space to provide a hydrogen tank on a vehicle, and further there is a need for a continuous supply of hydrogen ($H_2$) from the outside of the vehicle thereto.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a fuel reforming system for a vehicle, the system being configured to maximize fuel combustion performance of an engine with a relatively simple and compact construction by being mounted in an engine compartment of the vehicle with the engine and by continuously supplying hydrogen ($H_2$) to the engine by reforming a predetermined amount of fuel that is to be supplied to the engine, rather than supplying hydrogen ($H_2$) from the outside of the vehicle.

In one aspect of the present disclosure, there is provided a fuel reforming system for a vehicle, the system including: an Exhaust Gas Recirculation (EGR) line for recirculating a part of exhaust gas of an engine towards an intake side; a fuel reformer provided on the EGR line, the fuel reformer reforming fuel that is to be supplied to the engine and the fuel reformer supplying the reformed fuel to the engine via the EGR line; an EGR valve provided downstream of the fuel reformer; and a pressure control valve provided in the fuel reformer for controlling an inner pressure of the fuel reformer.

Other aspects of the present disclosure may include an EGR cooler provided on the EGR line in the downstream of the fuel reformer.

The EGR line may connect a portion located between a downstream of a turbine of a turbocharger and a catalytic converter to an upstream of a compressor of the turbocharger.

Other aspect of the present disclosure may further include a bypass valve provided upstream of the fuel reformer.

The EGR line may be provided by connecting from a downstream of a catalytic converter provided downstream of a turbocharger to an upstream of a compressor of the turbocharger.

The EGR line may connect an upstream portion of a turbine of a turbocharger to an upstream portion of a compressor of the turbocharger.

Further, a fuel reforming system for a vehicle may include an EGR line for recirculating a part of exhaust gas of an engine towards an intake side; a fuel reformer provided on the EGR line, the fuel reformer reforming fuel that is to be supplied to the engine and the fuel reformer supplying the reformed fuel to the engine via the EGR line; and an EGR valve provided upstream of the fuel reformer.

Other aspect of the present disclosure can maximize the fuel combustion performance of an engine with a relatively simple and compact construction by being provided in an engine compartment of a vehicle with the engine and by continuously supplying hydrogen ($H_2$) to the engine by reforming a predetermined amount of fuel that is to be supplied to the engine, rather than supplying hydrogen ($H_2$) from the outside of the vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
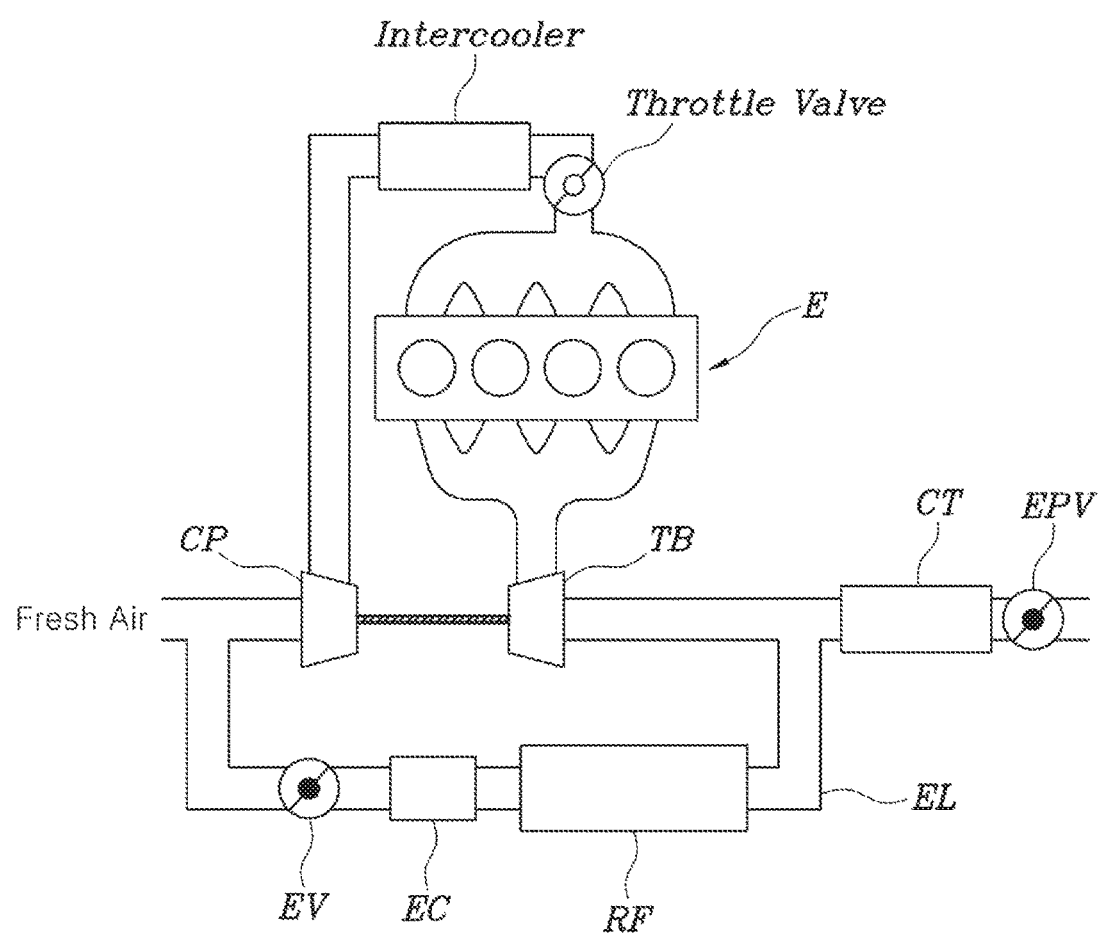
FIG. 1 is a view showing a first exemplary embodiment of the present disclosure.

Hereinbelow, exemplary embodiments of the present disclosure will be described in detail with reference to the accompanying drawings. Throughout the drawings, the same reference numerals will refer to the same or like parts.

Exemplary embodiments of the present disclosure in FIGS. 1 to 6 may equally include: an EGR line EL provided to pass EGR (exhaust gas recirculation) gas of an engine E towards an intake side; an EGR valve EV provided on the EGR line EL to regulate the amount of exhaust gas passing the EGR line EL; and a fuel reformer RF provided on the EGR line EL, and reforming a predetermined amount of fuel by using the exhaust gas passing the EGR line EL and supplying the reformed fuel to the engine E via the EGR line EL.

Figure 7:
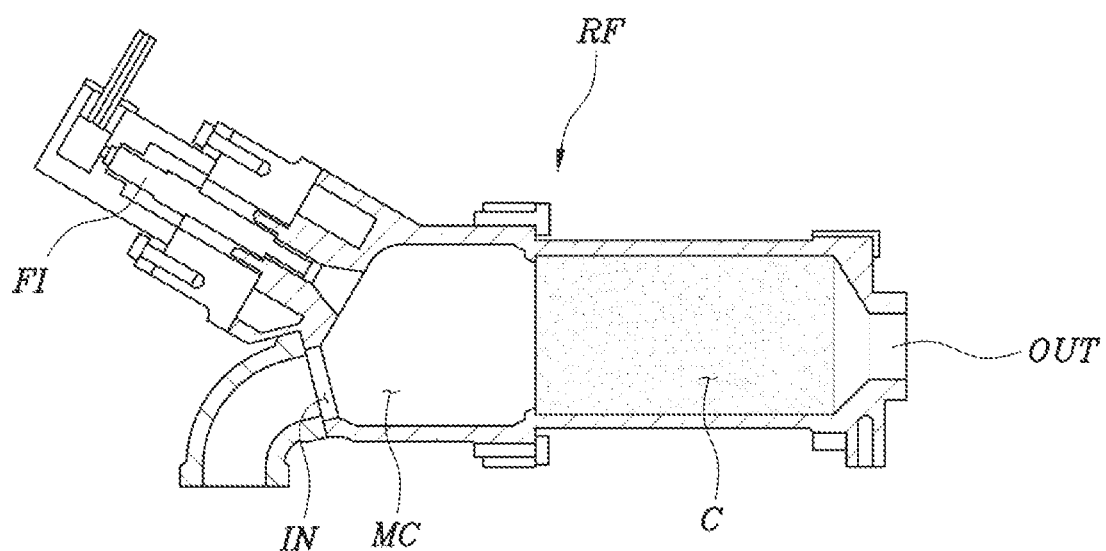
FIG. 7 is a cross sectional view showing a fuel reformer that may be used in an exemplary embodiment of present disclosure.

An EGR cooler EC may be further provided on the EGR line EL to cool down EGR gas, and the fuel reformer RF, as shown in FIG. 7, may be provided with fuel reforming catalyst C that can perform at least one of steam reforming and partial oxidation by using fuel and exhaust gas supplied via the EGR line EL.

The stream reforming reaction is represented by a following reaction formula: $CmHn+H_2O \rightarrow H_2+CO$ (in which m and n are natural numbers) where CmHn of fuel ingredients is reacted with water and is reformed to hydrogen $H_2$.

The Partial Oxidation reaction is represented by a following reaction formula: $CmHn+O_2 \rightarrow H_2+CO$ (in which m and n are natural numbers) where CmHn of fuel ingredients is reacted with oxygen and is reformed to hydrogen $H_2$.

In other words, in the fuel reformer RF, when EGR gas, or exhaust gas flows into an inlet IN, and fuel supplied from a fuel injector FI is combined with the exhaust gas in a mixing chamber MC, a mixture of the fuel and the exhaust gas is passed the fuel reforming catalyst C of the fuel reformer RF, which produces hydrogen-containing gas and discharges the hydrogen-containing gas to an outlet OUT.

In first to fourth exemplary embodiments of FIGS. 1 to 4, the EGR line EL extends between a downstream portion of a turbine TB of a turbocharger and a catalytic converter CT to an upstream portion of a compressor CP of the turbocharger.

Such an arrangement of the fuel reforming system, wherein exhaust gas that avoids passing a catalytic converter CT passes the fuel reformer RF such that the exhaust gas passing the fuel reformer RF has a higher temperature than the exhaust gas passing the catalytic converter CT and flowing into the fuel reformer RF, is advantageous in terms of improving reforming reaction efficiency.

Meanwhile, a back pressure valve EPV is provided downstream of the catalytic converter CT to control an exhaust pressure of the engine E.

Accordingly, a part of the exhaust gas discharged from the engine E passes the turbine TB and bypasses the EGR line EL to be supplied to the fuel reformer RF, and another part of the exhaust gas is purified by the catalytic converter CT and is discharged to the atmosphere, whereby at this time the back pressure valve EPV regulates the amount of exhaust gas to be discharged to the atmosphere via the catalytic converter CT. Thus the back pressure valve EPV regulates the back pressure of the engine E.

In the first to a third exemplary embodiments, the fuel reformer RF is provided upstream of the EGR cooler EC on the EGR line EL, and the EGR valve EV is provided downstream of the EGR cooler EC on the EGR line EL.

Accordingly, the exhaust gas (EGR gas) bypassed the EGR line EL passes the fuel reformer RF and is cooled down by the EGR cooler EC and is supplied upstream of the compressor CP based on the amount of control of the EGR valve EV to flow into the engine E.

In the fuel reforming system for the vehicle having the above-mentioned configuration, the fuel reforming RF is mounted in an engine compartment by using an EGR apparatus that is conventionally provided in the engine E for reducing nitrogen oxide. Thus, the fuel reforming system minimizes a number of additional parts and permits easy installation and a compact configuration.

Further, the configuration where the fuel reformer RF is provided upstream of the EGR cooler EC, allows the EGR gas to pass the fuel reformer RF before the EGR gas cools down in the EGR cooler EC. Thus, the configuration quickly activates the fuel reforming catalyst C of the fuel reformer RF and sufficiently utilizes heat of exhaust gas for fuel reforming performance.

Figure 2:
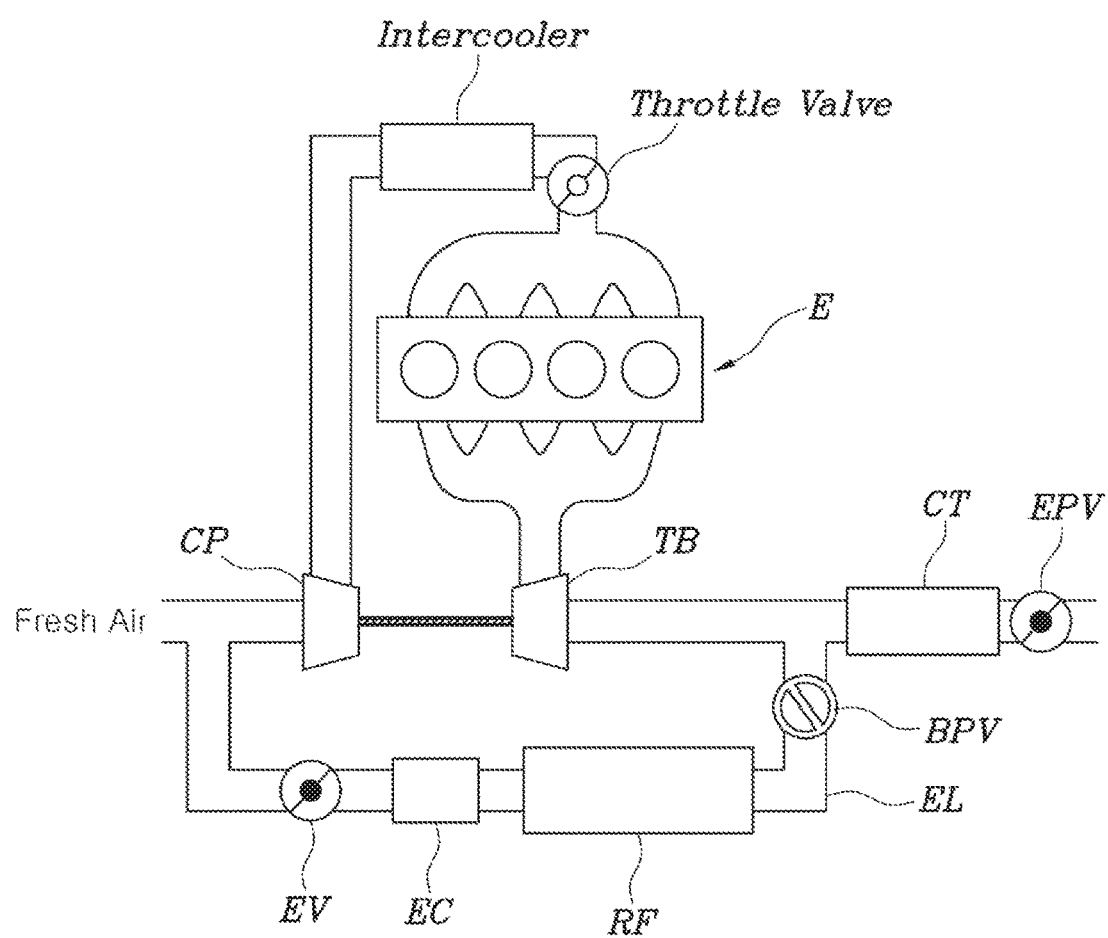
FIG. 2 is a view showing a second exemplary embodiment of the present disclosure.

In a second exemplary embodiment of FIG. 2, a bypass valve BPV is further provided upstream of the fuel reformer RF to regulate the amount of exhaust gas that is bypassed from an exhaust pipe to the EGR line EL.

The bypass valve BPV supplies the exhaust gas flowing into the fuel reformer RF only when required, thereby efficiently preventing a deterioration of the fuel reforming catalyst C.

In other words, in the case that the bypass valve BPV is not provided, even when exhaust gas avoids passing the EGR line EL since the EGR valve EV is closed, the catalyst deterioration in an upstream side of the fuel reforming catalyst C of the fuel reformer RF proceeds by being continuously exposed to exhaust gas. However, in the case that the bypass valve BPV is provided, when an EGR process and fuel reforming are not required, the catalyst deterioration is relatively delayed by closing the bypass valve BPV to substantially completely interrupt contact between the fuel reforming catalyst C and the exhaust gas.

Figure 3:
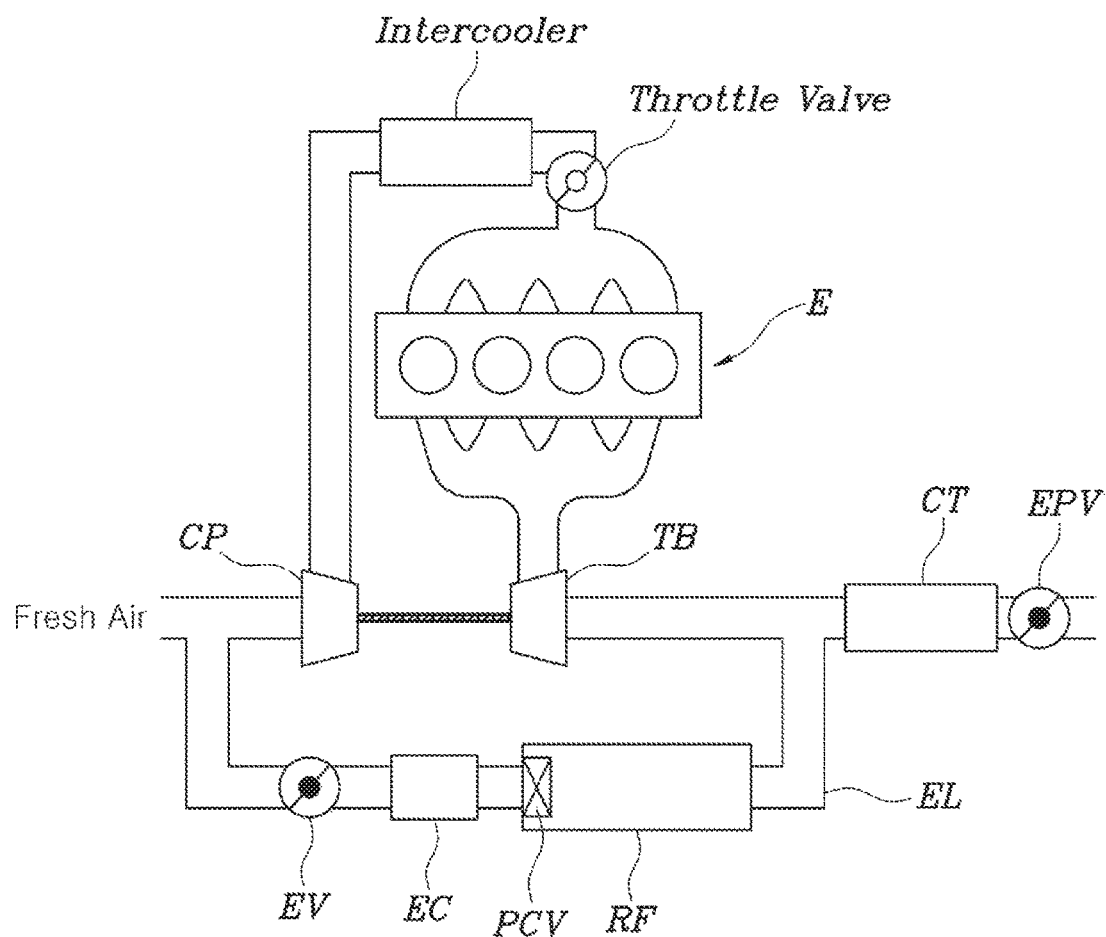
FIG. 3 is a view showing a third exemplary embodiment of the present disclosure.

Meanwhile, in a third exemplary embodiment of FIG. 3, there may further be provided a pressure control valve PCV that passes exhaust gas by opening when the inner pressure of the fuel reformer RF is a predetermined level or higher.

The pressure control valve PCV regularly controls the flow rate of EGR gas passing the fuel reformer RF at an optimum level for fuel reforming performance. In other words, when the flow amount of the EGR gas is low, the pressure control valve PCV relatively increases the flow rate of the EGR gas passing the fuel reformer RF by relatively decreasing the degree of opening thereof. When the flow amount of the EGR gas is excessively high, the pressure control valve PCV relatively decreases the flow rate of the EGR gas passing the fuel reformer RF by relatively increasing the degree of opening thereof. The pressure control valve PCV ultimately regulates the flow rate of the EGR gas passing the fuel reformer RF at an optimum level for fuel reforming performance regardless of a variation in the flow rate of the EGR gas.

Figure 4:
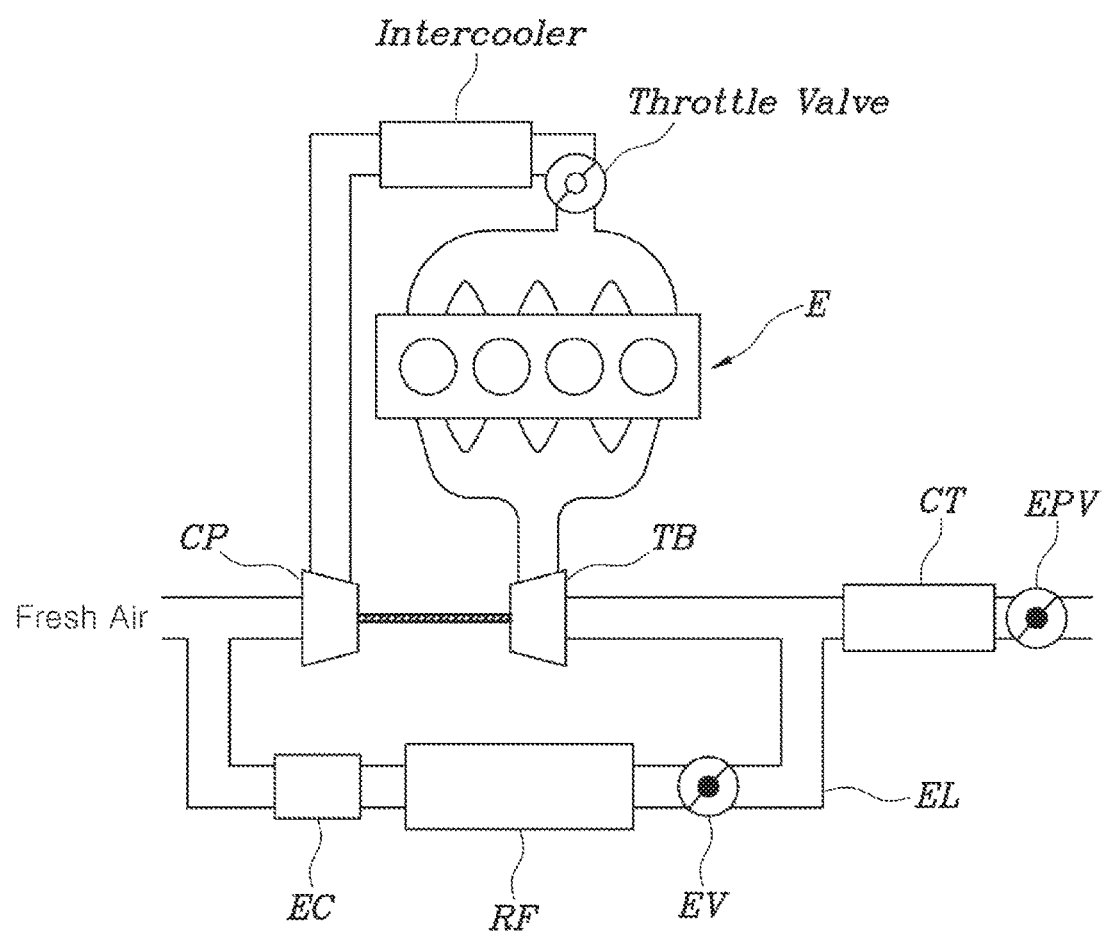
FIG. 4 is a view showing a fourth exemplary embodiment of the present disclosure.

Meanwhile, in a forth exemplary embodiment of FIG. 4, the fuel reformer RF may be provided upstream of the EGR cooler EC, and the EGR valve EV may be provided upstream of the fuel reformer RF, which results in a substantially different configuration as compared with the first exemplary embodiment of FIG. 1. The fourth embodiment is advantageous in that the EGR valve EV also performs the function of preventing deterioration of the fuel reforming catalyst C that is performed by the bypass valve BPV in the embodiment of FIG. 2.

Figure 5:
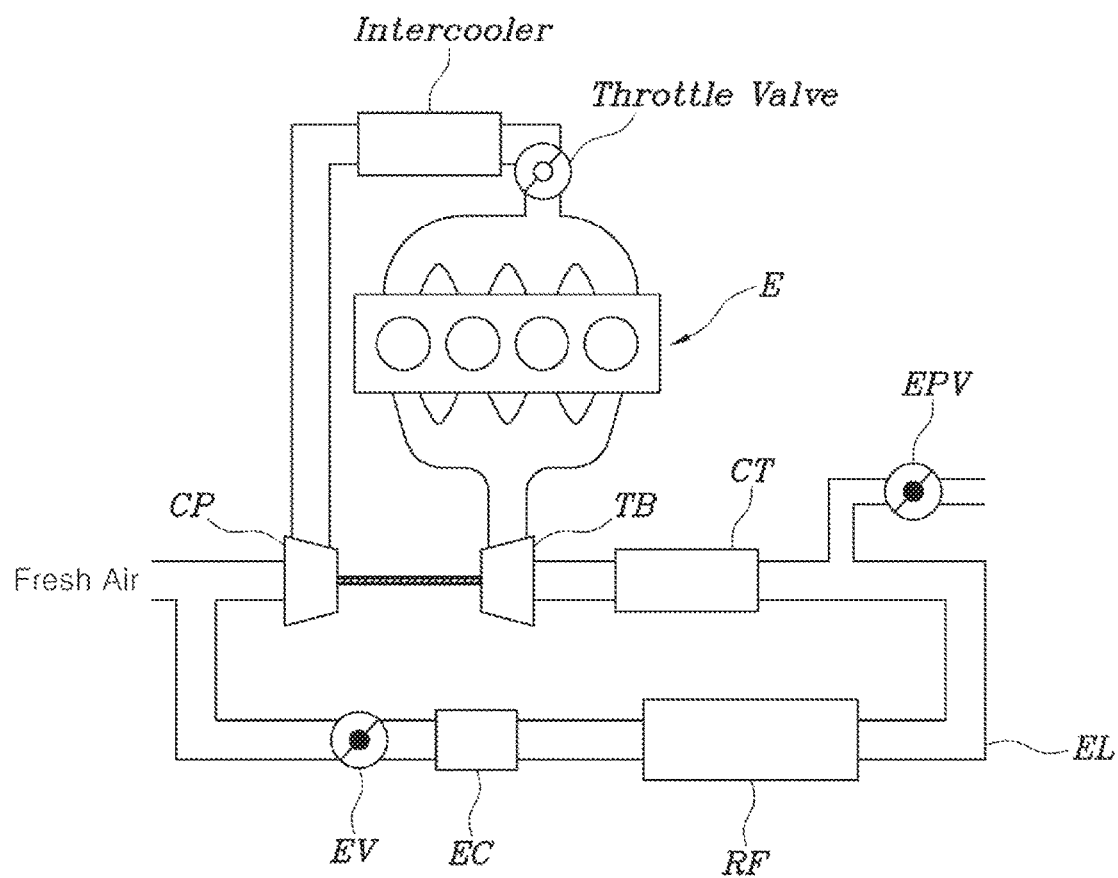
FIG. 5 is a view showing a fifth exemplary embodiment of the present disclosure.

In a fifth exemplary embodiment of FIG. 5, the EGR line EL may be provided by extending from a downstream portion of a catalytic converter CT provided downstream of a turbocharger to an upstream portion of a compressor CP of the turbocharger.

Here, the fuel reformer RF is provided upstream of the EGR cooler EC, and the EGR valve EV is provided downstream of the EGR cooler EC.

In the fifth embodiment, exhaust gas flowing into the EGR line EL is already purified by the catalytic converter CT, so this embodiment can reduce an accumulation of impurities on the fuel reforming catalyst C of the fuel reformer RF. Thus, this embodiment can increase the lifespan of the fuel reformer RF without using the additional bypass valve BPV.

Figure 6:
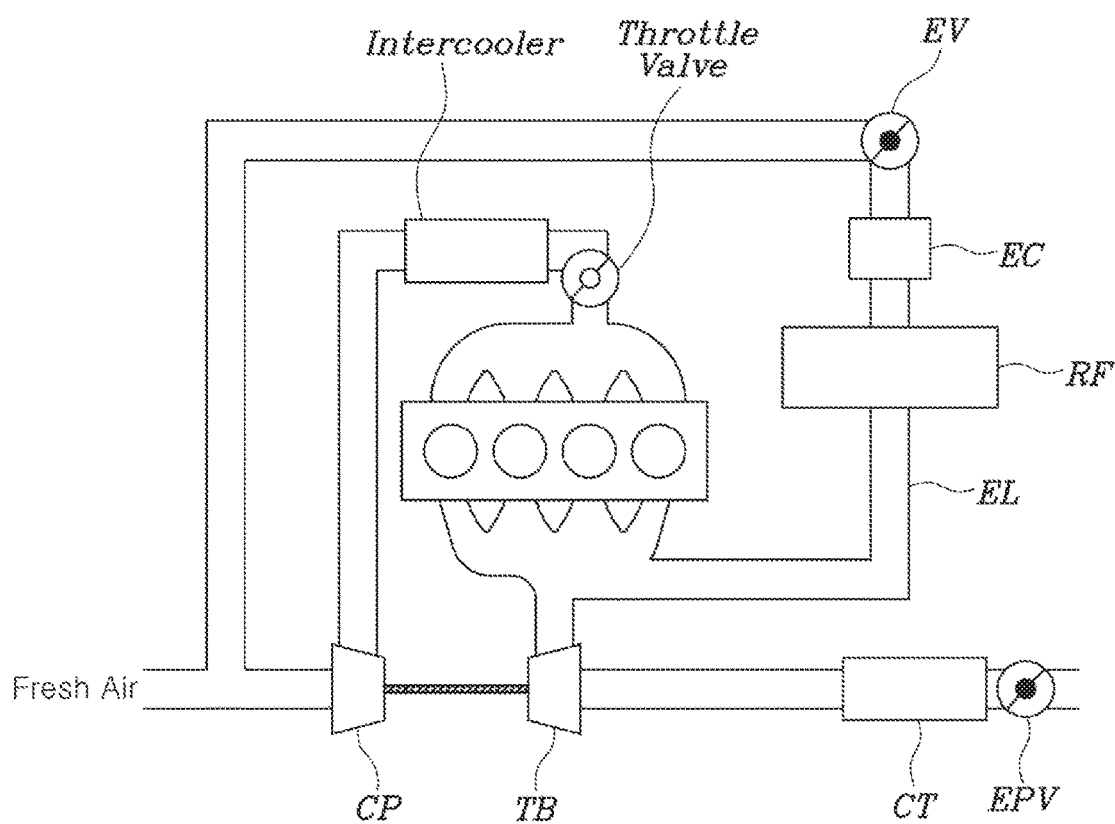
FIG. 6 is a view showing a sixth exemplary embodiment of the present disclosure.

In a sixth exemplary embodiment of FIG. 6, the EGR line EL may be provided by extending from an upstream portion of a turbine TB of a turbocharger to an upstream portion of a compressor CP of the turbocharger.

Here, on the EGR line EL, the fuel reformer RF is provided upstream of the EGR cooler EC, and the EGR valve EV is provided downstream of the EGR cooler EC.

In this embodiment, exhaust gas supplied to the EGR line EL has a relatively high pressure and temperature when compared to that of the other embodiments. Thus, this sixth embodiment is advantageous in that it can more quickly activate the fuel reforming catalyst C of the fuel reformer RF and can more efficiently perform the fuel reforming process.

Although a preferred embodiment of the present disclosure has been described for illustrative purposes, those skilled in the art will appreciate that various modifications, additions and substitutions are possible without departing from the scope and spirit of the disclosure as disclosed in the accompanying claims.

What is claimed is:

1. A fuel reforming system for a vehicle, the system comprising:
   an Exhaust Gas Recirculation (EGR) line for recirculating a part of exhaust gas of an engine towards an intake side;
   a fuel reformer provided on the EGR line, the fuel reformer reforming fuel that is to be supplied to the engine, and the fuel reformer supplying the reformed fuel to the engine via the EGR line;
   an EGR valve provided downstream of the fuel reformer;
   a pressure control valve provided in the fuel reformer for controlling an inner pressure of the fuel reformer; and
   a bypass valve provided at the EGR line in an upstream of the fuel reformer to block contact between a fuel reforming catalyst of the fuel reformer and the exhaust gas by closing the bypass valve.

2. The fuel reforming system of claim 1, further comprising an EGR cooler provided on the EGR line downstream of the fuel reformer.

3. The fuel reforming system of claim 1, wherein the EGR line connects a portion located between a downstream of a turbine of a turbocharger and a catalytic converter to an upstream of a compressor of the turbocharger.

4. The fuel reforming system of claim 1, wherein the EGR line is provided by extending from a downstream of a catalytic converter provided downstream of a turbocharger to an upstream of a compressor of the turbocharger.

5. The fuel reforming system of claim 1, wherein the EGR line connects an upstream portion of a turbine of a turbocharger to an upstream portion of a compressor of the turbocharger.

6. A fuel reforming system for a vehicle, the system comprising:
   an Exhaust Gas Recirculation (EGR) line for recirculating a part of exhaust gas of an engine towards an intake side;
   a fuel reformer provided on the EGR line, the fuel reformer reforming fuel that is to be supplied to the engine and the fuel reformer supplying the reformed fuel to the engine via the EGR line;
   an EGR valve provided upstream of the fuel reformer; and
   a bypass valve provided at the EGR line in an upstream of the fuel reformer to block contact between a fuel reforming catalyst of the fuel reformer and the exhaust gas by closing the bypass valve.

* * * * *